United States Patent
Kalscheur et al.

(10) Patent No.: US 9,846,473 B1
(45) Date of Patent: Dec. 19, 2017

(54) DISPLAY WITH WINDOWS FOR VISIBLE AND INFRARED COMPONENTS

(71) Applicant: Apple Inc., Cupertino, CA (US)

(72) Inventors: Micah P. Kalscheur, San Francisco, CA (US); Matthew C. Waldon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 14/668,719

(22) Filed: Mar. 25, 2015

(51) Int. Cl.
  *G06F 1/32* (2006.01)
  *G01J 5/34* (2006.01)
  *G01J 5/08* (2006.01)
  *G01J 5/12* (2006.01)
  *G01J 5/00* (2006.01)

(52) U.S. Cl.
  CPC .......... *G06F 1/3231* (2013.01); *G01J 5/0025* (2013.01); *G01J 5/0806* (2013.01); *G01J 5/0862* (2013.01); *G01J 5/12* (2013.01); *G01J 5/34* (2013.01); *G01J 2005/0077* (2013.01); *G01J 2005/123* (2013.01)

(58) Field of Classification Search
  CPC .................................................. G06F 1/3231
  USPC .......................................... 345/55–111, 207
  See application file for complete search history.

(56) References Cited

U.S. PATENT DOCUMENTS

| | | | |
|---|---|---|---|
| 7,570,329 B2 | 8/2009 | Huang et al. | |
| 8,878,817 B2 | 11/2014 | Noma et al. | |
| 8,912,480 B2 | 12/2014 | Pope et al. | |
| 8,981,302 B2 | 3/2015 | Yang et al. | |
| 2008/0284716 A1 | 11/2008 | Edwards et al. | |
| 2012/0176668 A1* | 7/2012 | Saito | G02B 1/04 359/357 |
| 2013/0048837 A1* | 2/2013 | Pope | G01J 1/0422 250/214.1 |

* cited by examiner

*Primary Examiner* — Michael Pervan
(74) *Attorney, Agent, or Firm* — Treyz Law Group, P.C.; G. Victor Treyz; Kendall W. Abbasi

(57) ABSTRACT

An electronic device may have light-based components. The light-based components may include light sources, light detectors, and image sensors. The light-based components may be aligned with a window in the device. The window may be formed within an inactive area of a display or within other device structures. The window may have one or more window members mounted within an opening in a display layer in the inactive area. Visible light blocking material such as chalcogenide glass may be incorporated into the window to provide the window with an opaque appearance that matches the opaque appearance of surrounding portions of the inactive portion of the display. In configurations in which the light-based components include a visible image sensor or other visible light detecting component, the window may be provided with a portion that is transparent at visible wavelengths.

28 Claims, 14 Drawing Sheets

DISPLAY WITH WINDOWS FOR VISIBLE AND INFRARED COMPONENTS

BACKGROUND

This relates generally to electronic devices, and more particularly, to electronic devices with components such as light sensors.

Electronic devices such as computers and cellular telephones may contain light-based components such as cameras and ambient light sensors. Light-based proximity sensors are used in cellular telephones to detect when a user has placed a cellular telephone against the user's head. These light-based components may be used to gather information on the environment in which a device is operating so that device functions can be adjusted appropriately.

It may be challenging to incorporate light-based components into an electronic device without disrupting the aesthetics and operation of the device. In devices with displays, for example, it may be desirable to form a window for a light sensor or camera so that the light sensor or camera can be mounted behind the display. If care is not taken, a window of this type may be overly conspicuous and or may not allow light-based components to function as desired. The light-based components that are included in a device may also be inadequate for gathering desired data on the operating environment of the device It would therefore be desirable to be able to provide improved windows and light-based components for an electronic device such as an electronic device with a display.

SUMMARY

An electronic device may have light-based components such as light sources, light detectors, and image sensors. The light-based components may be aligned with a window in the device. The window may be formed within an inactive border region of a display or within other device structures.

A window for light-based components may have one or more window members mounted within an opening in a display layer in an inactive portion of the display. Visible light blocking material such as chalcogenide glass may be incorporated into the window to provide the window with an opaque appearance that matches the opaque appearance of surrounding portions of the inactive portion of the display while simultaneously allowing infrared light such as light in a region of wavelengths between 5 and 14 microns or other suitable infrared light to pass to infrared light sensors aligned with the window. The infrared light sensors may be light detectors that contain a small number of individual light detecting elements or may be two-dimensional infrared image sensors.

In configurations in which the light-based components include a visible image sensor or other visible light detecting component, the window may be provided with a portion that is transparent at visible wavelengths. For example, the window may have an infrared-transparent ring that passes light to infrared detectors while blocking visible light and may have a central region of glass formed within the ring that is transparent at visible wavelengths.

Infrared detectors such as thermopile and pyroelectric detectors may be used to monitor for the presence of a user in the vicinity of the electronic device while consuming small amounts of power. Fresnel lenses or other light directing structures may be used to direct light to the infrared detectors. A visible light camera or other component can be awakened upon detection of the presence of a user or other suitable actions may be taken.

DETAILED DESCRIPTION

Electronic devices may include light-based components. Light-based components may be mounted behind one or more windows in the device. The windows may be formed in an inactive border region in a display or may be formed elsewhere in an electronic device. Configurations in which windows for light-based components are formed in displays are sometimes described herein as an example.

Illustrative electronic devices that may be provided with displays having windows for light-based components are shown in FIGS. 1, 2, 3, and 4.

Figure 1:
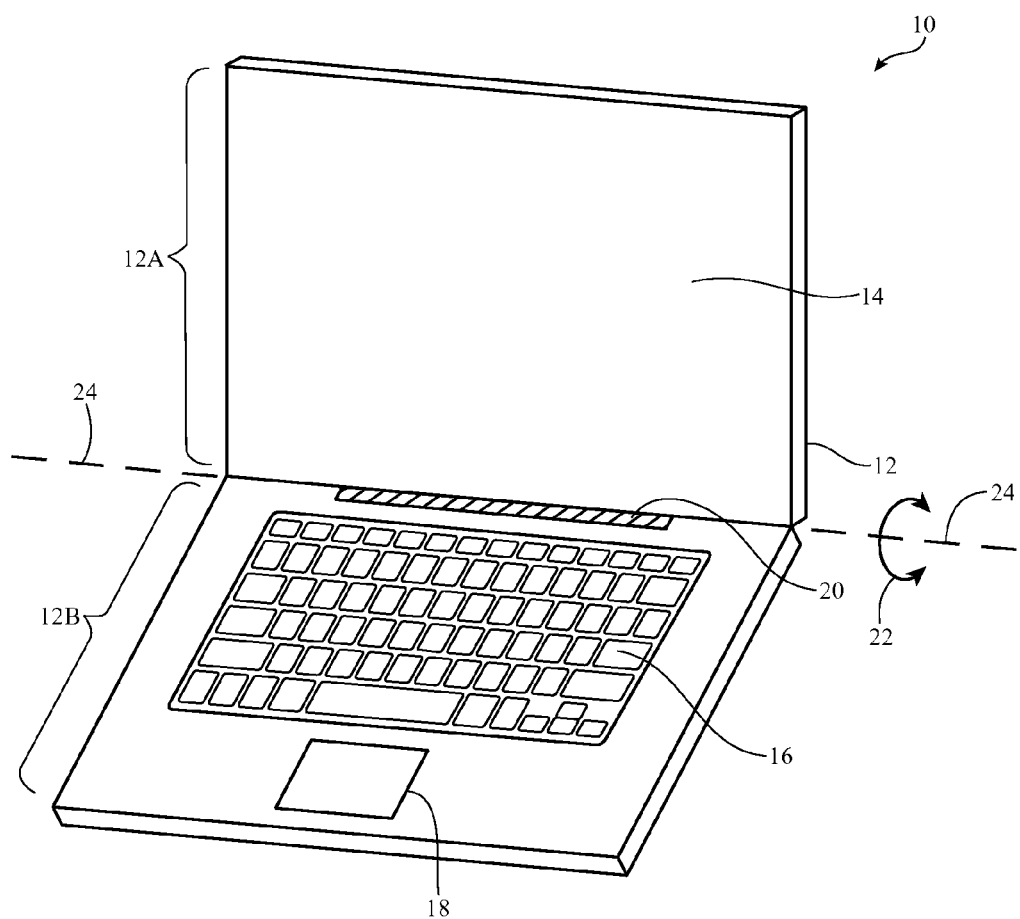
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
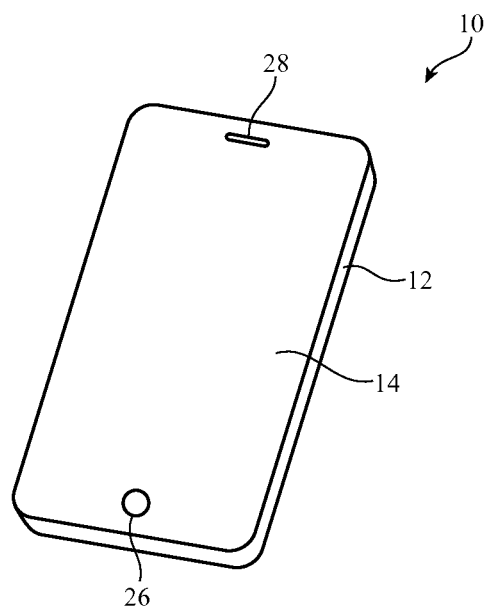
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
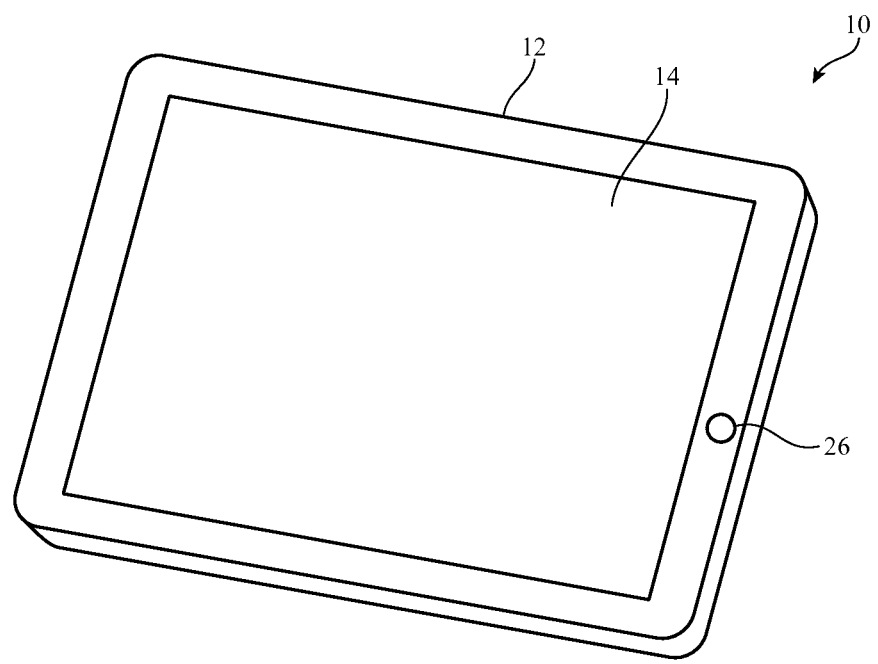
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
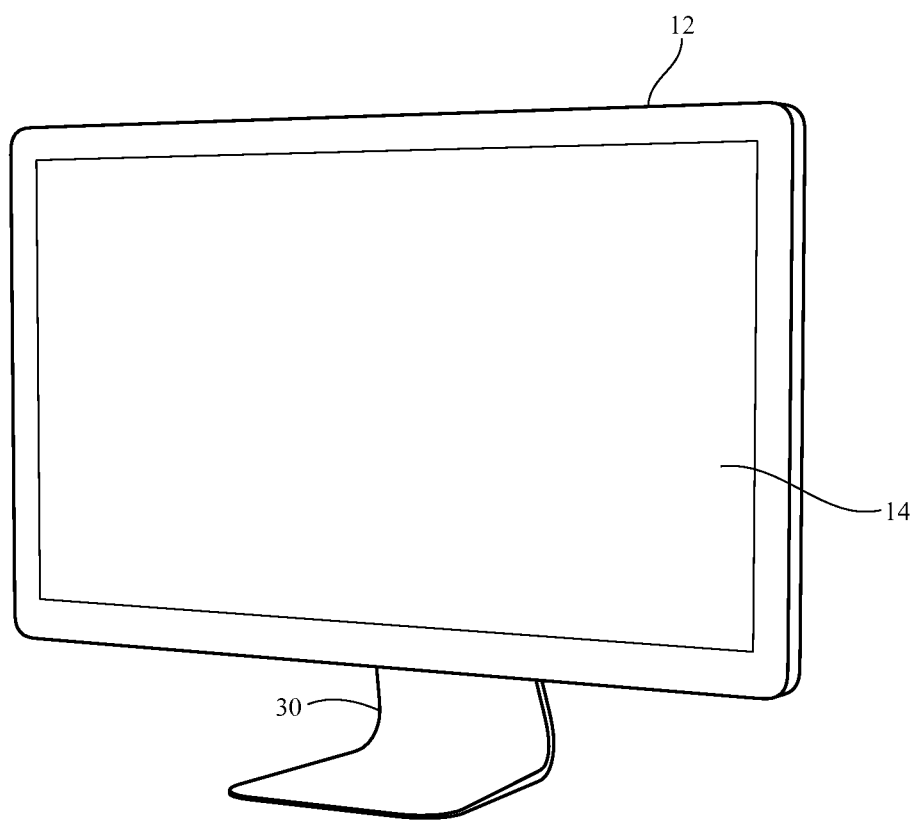
FIG. 4 is a perspective view of an illustrative electronic device such as a computer display with display structures in accordance with an embodiment.

FIG. 4 shows how electronic device 10 may be a display that includes an integrated computer, a stand-alone monitor associated with a computer or other external electronic equipment, a monitor in an embedded system, or other equipment with a display. As shown in the example of FIG. 4, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may be a liquid crystal display, an organic light-emitting diode display, an electrophoretic display, a plasma display, or a display based on other display technologies.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, a layer of sapphire, ceramic, a transparent crystalline dielectric material, or other transparent member. Display 14 may have a planar profile, a curved profile, or other suitable cross-sectional shape. The outline of display 14 when viewed from the front of display 14 may be rectangular, may be circular, or may have other shapes. Configurations in which display 14 is planar and has a rectangular outline are sometimes described herein as an example. This is, however, merely illustrative. Display 14 may have any suitable shape.

Figure 5:
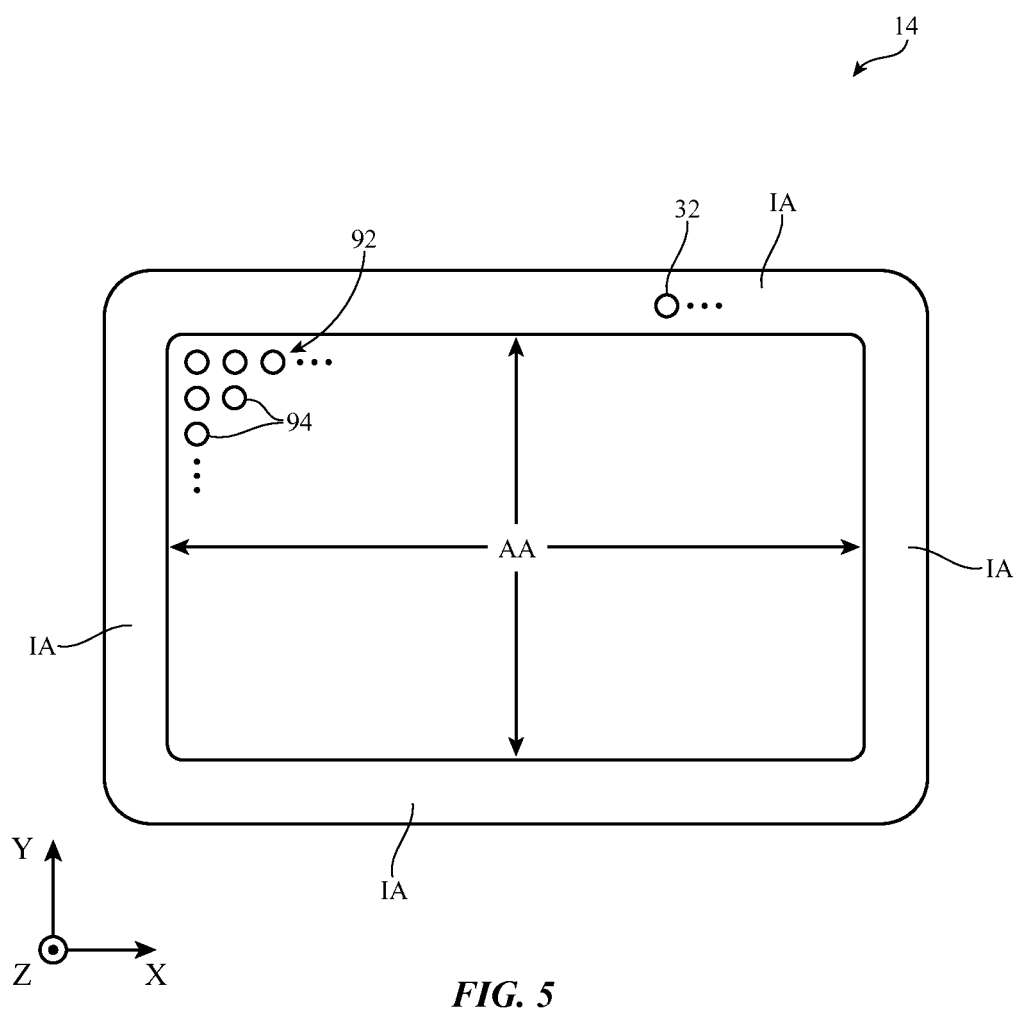
FIG. 5 is a front view of an illustrative display showing where a window for a light-based component may be located in accordance with an embodiment.

FIG. 5 is a front view of an illustrative display for device 10. As shown in FIG. 5, display 14 may include an active area such as rectangular active area AA that displays images for a user and may include an inactive area such as inactive border area IA that runs along one or more edges of active area AA. As an example, inactive border area IA may form a rectangular ring that surrounds active area AA, as shown in FIG. 5. Configurations in which border IA runs along only one edge, only two edges, only three edges, or along parts of some or all edges of display 14 may also be used.

Active area AA contains pixel array 92. Pixel array 92 contains an array of pixels such as pixels 94. Pixel array 92 may be controlled using control signals produced by display driver circuitry. The display driver circuitry may include one or more integrated circuits (e.g., timing controller integrated circuits) and/or thin-film transistor circuitry (e.g., data line demultiplexing circuitry and/or gate driver circuitry). The display driver circuitry of display 14 (e.g., the thin-film transistor circuitry such as the demultiplexer circuitry and gate driver circuitry) may be located in inactive area IA.

During operation of device 10, control circuitry in device 10 such as memory circuits, microprocessors, and other storage and processing circuitry may provide data to the display driver circuitry. The display driver circuitry may convert the data into signals for controlling rows and columns of display pixels 94 in pixel array 92.

Pixels 94 in pixel array 92 may contain thin-film transistor circuitry (e.g., polysilicon transistor circuitry, semiconducting-oxide transistor circuitry, etc.). In liquid crystal displays, pixel 94 may contain thin-film transistors and electrode structures for producing electric fields across a liquid crystal layer in display 14. In organic light-emitting diode displays, the pixel circuitry of pixels 94 may contain thin-film transistors and organic light-emitting diodes for generating images. Other types of display may contain other pixel structures (e.g., plasma pixels, electrophoretic pixels, etc.).

To block internal device components from view, inactive area IA of display 14 may contain opaque masking structures. For example, the inner surface of the outermost layer in display 14 (e.g., the inner border of a display cover layer for display 14) may be provided with an opaque layer of material such as black ink, white ink, ink of other colors, or other opaque masking material. The opaque masking layer may have one or more openings to accommodate light-based components. The opaque masking layer openings and optical structures that are aligned with the openings allow light to pass for light-based components and are sometimes referred to as windows, light-based component windows, optical windows, etc.

As shown in FIG. 5, one or more windows such as window 32 may be formed in inactive area IA along the upper edge of display 14. If desired, windows such as window 32 may be located along one or more other edges of display 14 (e.g., in inactive area IA on the left or right edge of display 14, in inactive area IA along the lower edge of display 14, etc.). Windows such as window 32 may also be formed in housing 12 or other portions of device 10. Illustrative configurations in which window 32 is formed in inactive area IA of display 14 in device 10 are sometimes descried herein as an example.

Figure 6:
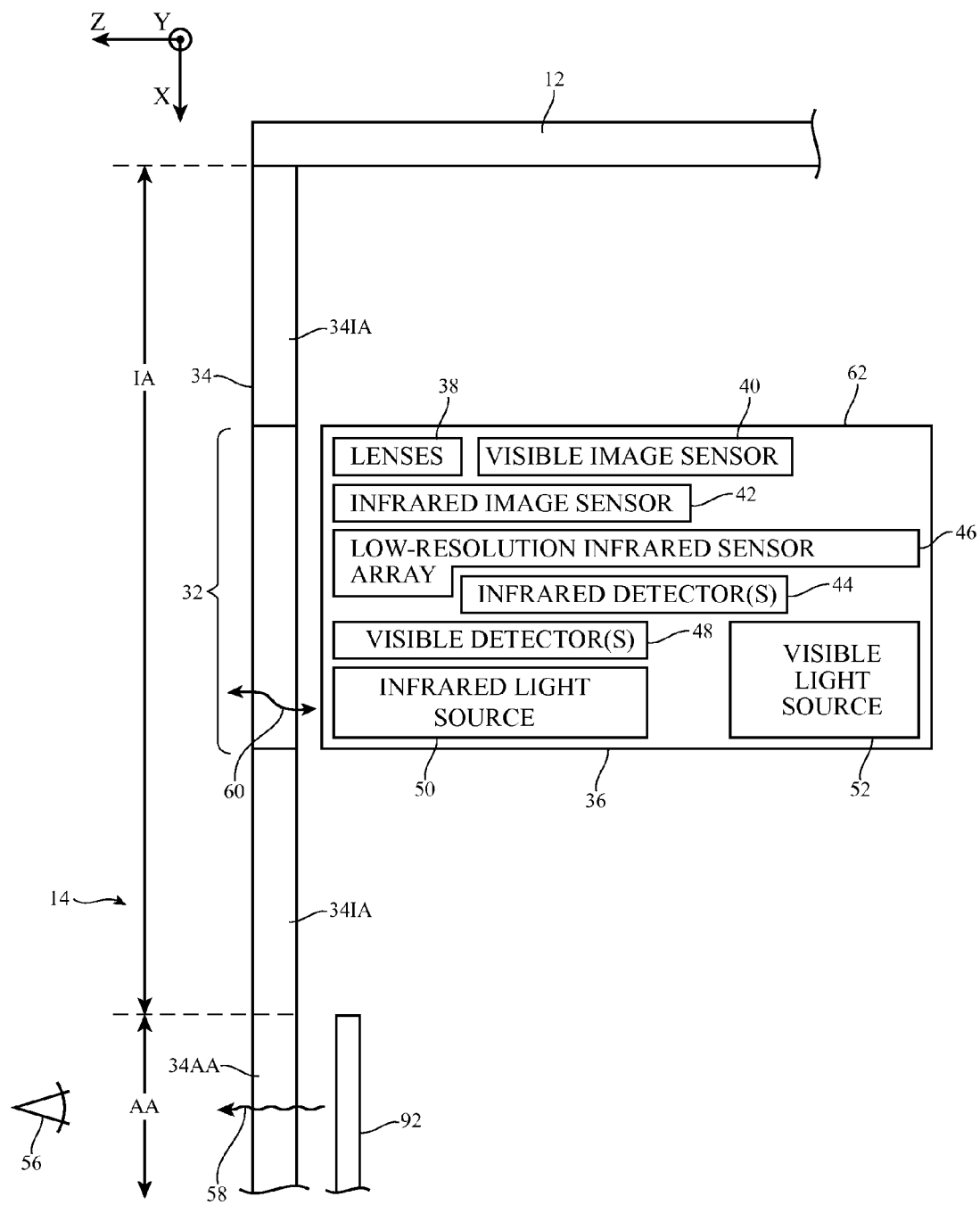
FIG. 6 is a side view of an illustrative electronic device having a display and a light-based component mounted in alignment with a window in the display in accordance with an embodiment.

A cross-sectional side view of device 10 is shown in FIG. 6. As shown in FIG. 6, display 14 may have an outermost layer such as layer 34. Layer 34 may be, for example, a display cover layer that covers and protects display layers that form a liquid crystal display, an organic light-emitting display, or other internal display structures. If desired, outer display layer 34 may be an extended portion of a display layer such as a color filter layer, thin-film transistor layer, or other outer display layer in display 14. Window 32 may be formed in layer 34. For example, window 32 may be formed in layer 34 in inactive area IA of display 14. In some configurations, window 32 may be formed by mounting one or more window members in an opening in layer 34.

Layer 34 and other portions of display 14 may be mounted in housing 12. To hide internal components in device 10 from view from a user, the portion of layer 34 in inactive area IA (i.e., portion 341) may be provided with opaque masking structures that render this portion opaque to visible light. The portion of layer 34 in active area AA of display (i.e., portion 34AA) may be transparent to visible light, so that light 58 from pixel array 92 can pass to viewer 56. This allows viewer 56 to view images on display 14.

Window 32 may be aligned with light-based components 62. Light-based components 62 may include components that emit light 60 and/or components that sense light 60. Window 32 may be transparent to light 60, so that light 60 can pass from components 62 to the exterior of device 10 and/or so that light 60 can pass from the exterior of device 10 to components 62 in the interior of device 10.

Light 60 may include visible and/or infrared light. Infrared light in light 60 may have a wavelength longer than 700 nm, may have a wavelength longer than 7 microns, may have a wavelength of 5-14 microns, may have a wavelength of 8-14 microns, may have a wavelength less than 14 microns, or may have any other suitable wavelength. The human body emits radiant heat in the form of light that peaks at a wavelength of about 9.4 microns, so windows that transmit light at this wavelength may allow detection of the presence of a human body in the vicinity of display 14.

Components 62 may include visible-light components and/or infrared-light components. For example, components 62 may include a visible image sensor 40. Sensor 40 may be part of a visible-light camera (e.g., a camera with a resolution sufficient to capture digital images of users in the vicinity of device 10 for functions such as videoconferencing, face detection, etc.). Lenses 38 may be used to focus light 60 onto image sensor 40 and/or may form parts of other components 62.

If desired, components 62 may include an infrared image sensor such as infrared image sensor 42. Image sensor 42 may capture digital images at infrared wavelengths. Sensor 42 may have the same resolution as visible image sensor 40 or may have a higher or lower resolution. A low-resolution infrared sensor array 46 may be used to capture infrared data at a resolution that is lower than that of image sensor 42. Sensor 42 may, for example, be a 5 megapixel infrared camera sensor and sensor 46 may be an infrared image sensor having a two-dimensional array of image sensor elements that is sufficient to capture rough images at a resolution such as 20×20 pixels, 100×100 pixels, or 1000× 1000 pixels. The resolution of sensor 46 may be less than 0.1 megapixels, less than 0.001 mega pixels, or other relatively low resolution. Restricting the resolution of sensor 46 may help enhance privacy in scenarios in which sensor 46 is always on (or nearly always on).

Infrared detectors 44 may gather infrared light without using an array of sensors (i.e., detectors 44 may include one or more solitary detectors or may contain a few sensor elements). Detectors 44 may, for example, include thermopile detectors, pyroelectric detectors, and other infrared detectors that are capable of detecting body heat from a user of device 10.

Visible detectors 48 may gather visible light using a relatively small number of sensor elements (e.g., one sensor element, two or more sensor elements, two to ten sensor elements, fewer than 10 elements, etc.). Detectors 48 may, for example, include an ambient light sensor.

In some situations, it may be desirable for components 62 to emit light (e.g., to help illuminate items in the vicinity of device 10). Illumination may be provided at visible wavelengths using visible light source 52 (e.g., a white light-emitting diode, a lamp, etc.) and may be provided at infrared wavelengths using infrared light source 52 (e.g., an infrared light-emitting diode, an infrared laser, an infrared lamp, etc.). In general, components 62 may include one or more of the components illustrated in FIG. 6, may include two or more of the components illustrated in FIG. 6, or may contain any other suitable number of the illustrative components of FIG. 6.

The visible and/or infrared sensing capabilities of components 62 may be used to detect the presence of users in the vicinity of device 10. For example, a camera may be used to capture images of users, image processing functions implemented on the control circuitry of device 10 may be used to detect user's faces, and other image processing operations may be performed to detect when a user is present and viewing display 14. As another example, an infrared sensor may detect the presence of one or more users (e.g., by detecting light at a wavelength between 5-14 microns or at a wavelength in a range of wavelengths from 8-14 microns using a sensor such as sensor 44, one or more of detectors 46, or other component 62). When a user is detected, device 10 can take appropriate action. For example, device 10 can activate display 14, can adjust audio playback, can adjust what type of content is presented to the user, can gather data, can turn on image processing functions (e.g., to gather video input from a user such as hand gestures), may activate input-output devices such as keyboard and touch pads, may wake up circuitry that is in a low-power sleep state, or may take other suitable actions.

Figure 7:
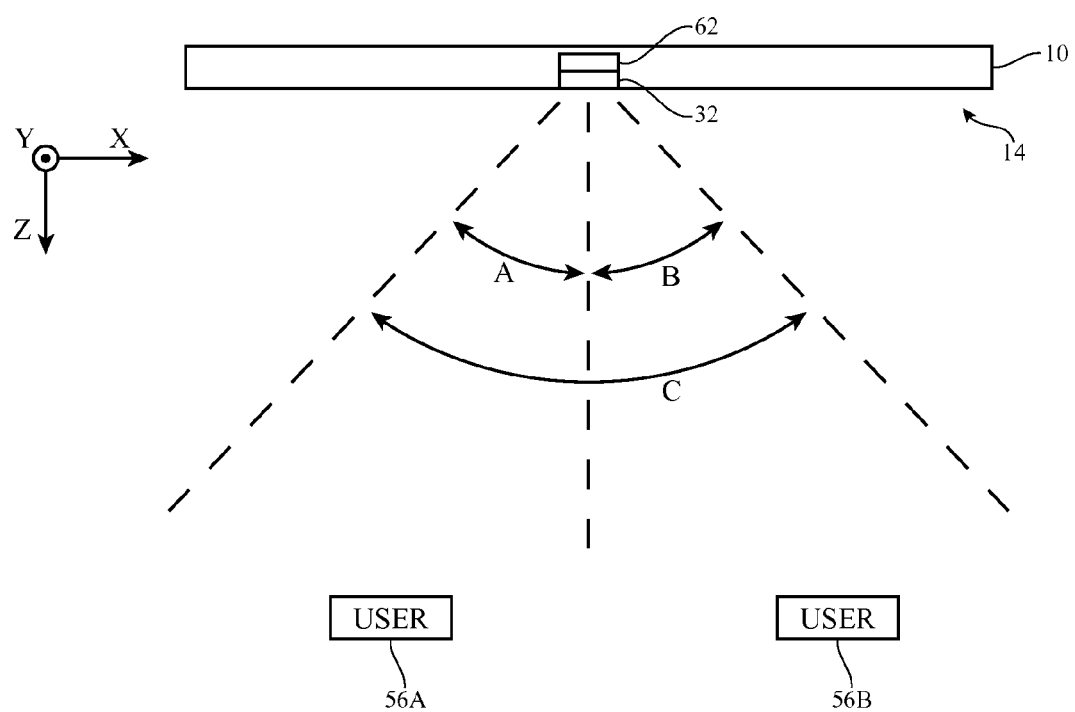
FIG. 7 is a top view of an illustrative display having light-based components for monitoring one or more users in the vicinity of the display through a window in accordance with an embodiment.

Consider, as an example, a scenario of the type shown in FIG. 7. FIG. 7 is a top view of an illustrative electronic device having light-based components mounted in display 14 behind window 32. In the example of FIG. 7, components 62 include a first light detector (e.g., an infrared detector)

that detects infrared light at a wavelength between 5 and 14 microns across angular range A and a second light detector of the same type that detects infrared light at a wavelength between 5 and 14 microns across angular range B. A third sensor (visible, infrared, etc.) may detect light over range C (e.g., using a different detection mechanism than is used by the first and second detectors). The first sensor can be used to detect when the user is in position 56A. The second sensor can be used to detect with the user is in position 56B. The third sensor can be used to detect whether any user is present in the vicinity of device 10 (e.g., whether a user is within 3-5 meters of device 10 in angular range C or is within any other suitable distance of device 10).

If desired, more detectors may be provided to detect the presence of users with a higher degree of angular discrimination. Based on knowledge of how many users are present and the location of those users, device 10 may make adjustments to display 14 (e.g., to optimize brightness, content, audio, etc.), may turn on or off device features, or may take other suitable action. As an example, device 10 may activate a visible image sensor in device 10 when it has been determined that one or more users is present in the vicinity of device 10. The visible image sensor can then be used to gather additional information from the user (hand gestures, images of the user for a video conference, face detection data indicating where the faces of the users are located, etc.).

Figure 8:
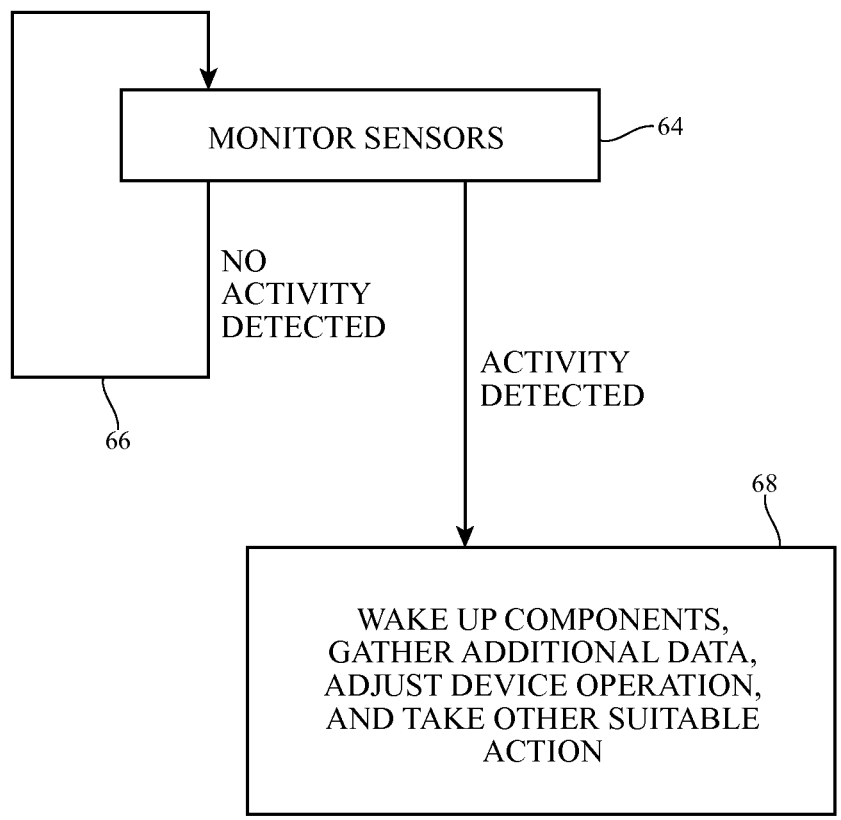
FIG. 8 is a flow chart of illustrative steps involved in operating an electronic device using data from light-based components in accordance with an embodiment.

FIG. 8 is a flow chart of illustrative operations involved in using equipment of the type shown in FIG. 7 to monitor and respond to user activity in the vicinity of device 10.

At step 64, components 62 may be used to gather information on the operating environment of device 10. Image sensor components may, for example, capture visible or infrared images. To minimize power consumption, it may be desirable to minimize how many of components 62 are active. For example, it may be desirable to use only one or a few infrared sensors to detect whether or not a user is present in the vicinity of device 10, as described in connection with the illustrative sensor angular sensitivity ranges A, B, and C of FIG. 7. The measurements that are made may be analyzed by device 10 to determine whether there is any user activity (i.e., whether a user is present in the vicinity of device 10 and/or whether a user is moving in the vicinity of device 10). So long as no user activity is detected, processing may loop back to step 64 for additional monitoring, as indicated by line 66.

If, however, user activity is detected (e.g., if a low power infrared sensor detects that a user is present and/or that a user is moving within the vicinity of device 10), device 10 may take suitable action at step 68. For example, device 10 may wake up additional components 62 (e.g., a camera may be activate to capture images of the user and/or other sleeping components may be awoken), may use components 62 to gather more data (e.g., to gather more detailed images and/or light sensor readings than would otherwise be gathered), may adjust the operation of device 10 (e.g., to turn on audio that would otherwise be muted), or may take any other suitable action.

To prevent window 32 from having an unsightly appearance, it may be desirable to match the color and opacity of window 32 to surrounding structures in display 14. For example, if portion 34IA of outer display layer 34 is black, it may be desirable to provide window 32 with a black appearance. At the same time, window 32 should be transparent at wavelengths of interest for the operation of components 62. For example, if components 62 include infrared detectors operating at one or more wavelength ranges between 5 and 12 microns, window 32 should be transparent for those wavelength ranges (e.g., 5-12 microns, 8-12 microns, an appropriate subset of wavelengths between 5 and 12 microns, etc.).

Figure 9:
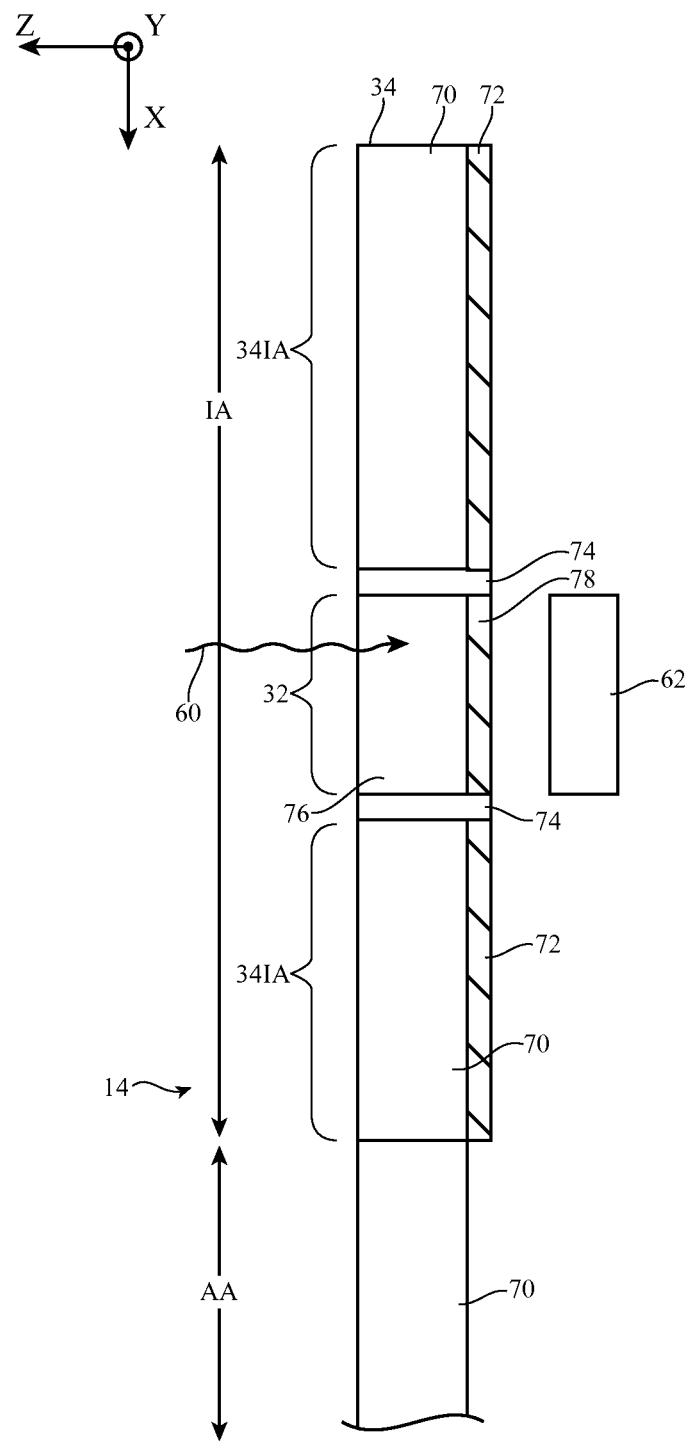
FIG. 9 is cross-sectional side view of an illustrative display with a window in accordance with an embodiment.

An illustrative configuration for display 14 in which window 32 is transparent at infrared wavelengths and has an appearance that helps window 32 visually blend with portion 34IA of outer display layer 34 is shown in FIG. 9. As shown in FIG. 9, display 14 may have outermost layer 34. Outermost layer 34 extends across inactive area IA and active area AA. Layer 34 may include transparent substrate 70 (e.g., a clear layer of glass, plastic, sapphire, ceramic, etc.). In inactive area IA, opaque masking layer 72 may be formed on the inner surface of substrate 70. Layer 72 may be, for example, black or white ink or other opaque material. In active area AA, substrate 70 is free of opaque masking layer 72 to allow display 14 to emit light from pixel array 92.

Window 32 may include one or more window members in an opening in layer 34. For example, window 32 may include window member 76 and layer 78. Window member 76 may be formed from a material that is transparent at wavelengths of interest for operating components 62. If, for example, components 62 include an infrared detector operating at a range of wavelengths between 5-12 microns or 8-12 microns, window member 76 may be formed from a material that is transparent (e.g., transmitting 50% or more, 80% or more, or other suitable elevated amount) at 5-12 microns, 8-12 microns, or an appropriate subset of these ranges. Examples of material for window structures such as window member 76 include magnesium fluoride, calcium fluoride, zinc selenide, zinc sulfide, or infrared transparent plastic material with a spectral transmittance that is tuned to pass long infrared wavelengths (e.g., 8-14 microns, 5-14 microns, etc.). If desired, the external surface of member 76 may be coated with an antireflection layer or other coating to help ensure that the reflectivity and sheen of member 76 matches that of substrate 70. Window member 76 may have the shape of a circular disk or other suitable window shape.

Member 76 may be relatively hard, so it may be desirable to interpose a layer of polymer or other bonding gap fill material (e.g., adhesive or other relatively soft material) between member 76 and substrate 70, as illustrated by fill material 74. The index of refraction of material 74 may be configured to enhance reflectivity for light 60 along the walls of member 76. The index of refraction of material 74 may, for example, be lower than the index of refraction of member 76 to confine light 60 within member 76 through the principal of total internal reflection or the index of refraction of material 74 may be greater than the index of refraction of member 76 to create a reflective interface that helps reflect light 60 along the interior of member 76. A metal trim or other structure may also be inserted between member 76 and substrate 70 to help confine light 60.

Window 32 may be provided with a darkened appearance using a layer of material that transmits infrared light at 5-14 microns, 8-14 microns, or other suitable infrared wavelengths while blocking visible light (e.g., while transmitting less than 40%, less than 20%, less than 5%, or less than other suitable low amounts of visible light). Layer 78 may be, for example, a structure such as a disk-shaped member formed from black chalcogenide glass. Black chalcogenide glass may have long-wave infrared spectral transmittance properties that allow layer 78 to be transparent at infrared wavelengths of interest for operation of an infrared detector in components 62 (e.g., sensor 44 and/or detectors 46 operating at one or more wavelengths between 5 and 14 microns, 8 to 14 microns, or other suitable wavelength)

while simultaneously exhibiting a black appearance or other dark appearance at visible wavelengths that matches the black color of layer 72. Other types of material that pass infrared light while blocking visible light may be used to form structure 78 if desired (e.g., polymers, thin-film interference filters, etc.). The use of chalcogenide glass is merely illustrative.

Figure 10:
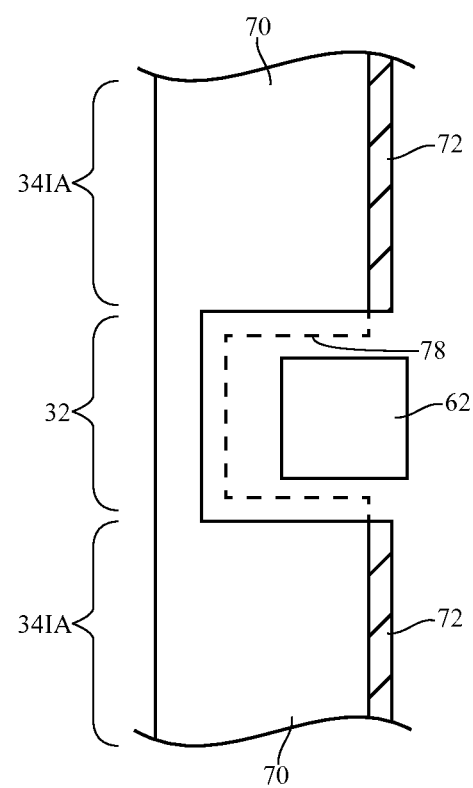
FIG. 10 is a cross-sectional side view of an illustrative window formed from a recessed portion of a display layer in accordance with an embodiment.

Transparent layer 70 may absorb more light at infrared wavelengths (e.g., 8-14 microns, etc.) than desired. Light transmittance at infrared wavelengths can be enhanced by locally thinning layer 70 in window 32. This type of arrangement is shown in FIG. 10. If desired, visible light blocking material 78 (e.g., a chalcogenide glass, polymer, thin-film interference filter layers, etc.) may be formed as a coating in the recess that is formed by thinning layer 70 locally in window 32 (see, e.g., dotted line 78 in FIG. 10) or may be formed from a disk of glass that is inserted into the recess.

Figure 11:
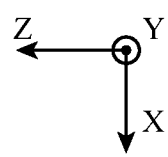
FIG. 11 is a cross-sectional side view of an illustrative window formed from a cluster of holes formed through a display layer in accordance with an embodiment.
Figure 11:
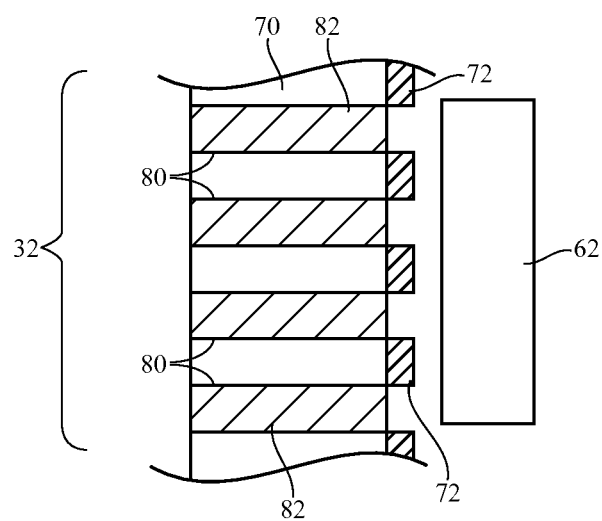

Another illustrative approach for forming infrared transparent windows that block visible light so that the windows appear similar to portion 34IA of display layer 34 is shown in FIG. 11. With this approach, a cluster of microperforations such as holes 80 may be formed through layer 70. Holes 80 may be formed by mechanical drilling, laser drilling, or other techniques for forming holes with small diameters (e.g., diameters less than 10 microns, less than 50 microns, less than 200 microns, less than 1500 microns, etc.). Holes 80 may be filled with infrared transparent material such as material 82 (e.g., an infrared-transparent polymer). The inner surface of substrate 70 may be coated with opaque layer 72, so that layer 70 appears dark (e.g., black). The total area consumed by openings 80 is preferably limited, so window 34 will be unnoticeable or barely noticeable to a user of device 10 who is viewing window 34 with a naked eye. At the same time, there are preferably a sufficient number of openings 80 in the cluster of openings forming window 32 (e.g., 10 or more, 3-50, less than 75) to ensure that sufficient infrared light (e.g., light at a wavelength between 5-14 or 8-14 microns) passes to components 62.

In some configurations, it may be desirable to incorporate both visible light and infrared light components in window 32. As an example, it may be desirable to incorporate infrared sensors to detect the presence of users. These sensors may be operated at a low power and may be constantly on or nearly constantly on. The components aligned with window 32 may also include a visible light component such as a digital image sensor in a camera. The camera may be used to conduct video calls, to gather hand gestures, to detect faces (e.g., as part of a face recognition algorithm to provide targeted services to particular uses and/or to determine when a user is actively viewing display 14, as part of a biometric identification scheme, etc.), to take pictures, to support operations in a game, etc. Operation of the video camera may consume more power than operation of the low-power infrared sensors, so power may be conserved by maintaining the camera in a low power sleep state until user activity is detected with the infrared sensor(s).

A window that is used to allow operation of a visible light camera may contain transparent structures and may therefore be difficult to completely hide from view from a user. To avoid creating more visible disruption than necessary, infrared sensor structures may be located under the same window as the visible light camera. As an example, one or more infrared light sensors may mounted adjacent to the visible light camera. The infrared light sensors may be arranged in a ring around the lens of the camera or may be mounted in the vicinity of the camera using other patterns. Window 32 may have a ring-shaped outer portion (or a portion of other shapes) that is transparent at infrared wavelengths to allow light to reach the infrared sensor(s) while being opaque a visible light wavelengths to help block the infrared sensors from view. The visible light camera may be mounted in alignment with a clear central disk of window material in window 32 (i.e., a glass window portion in the center of the ring-shaped outer portion).

Figure 12:
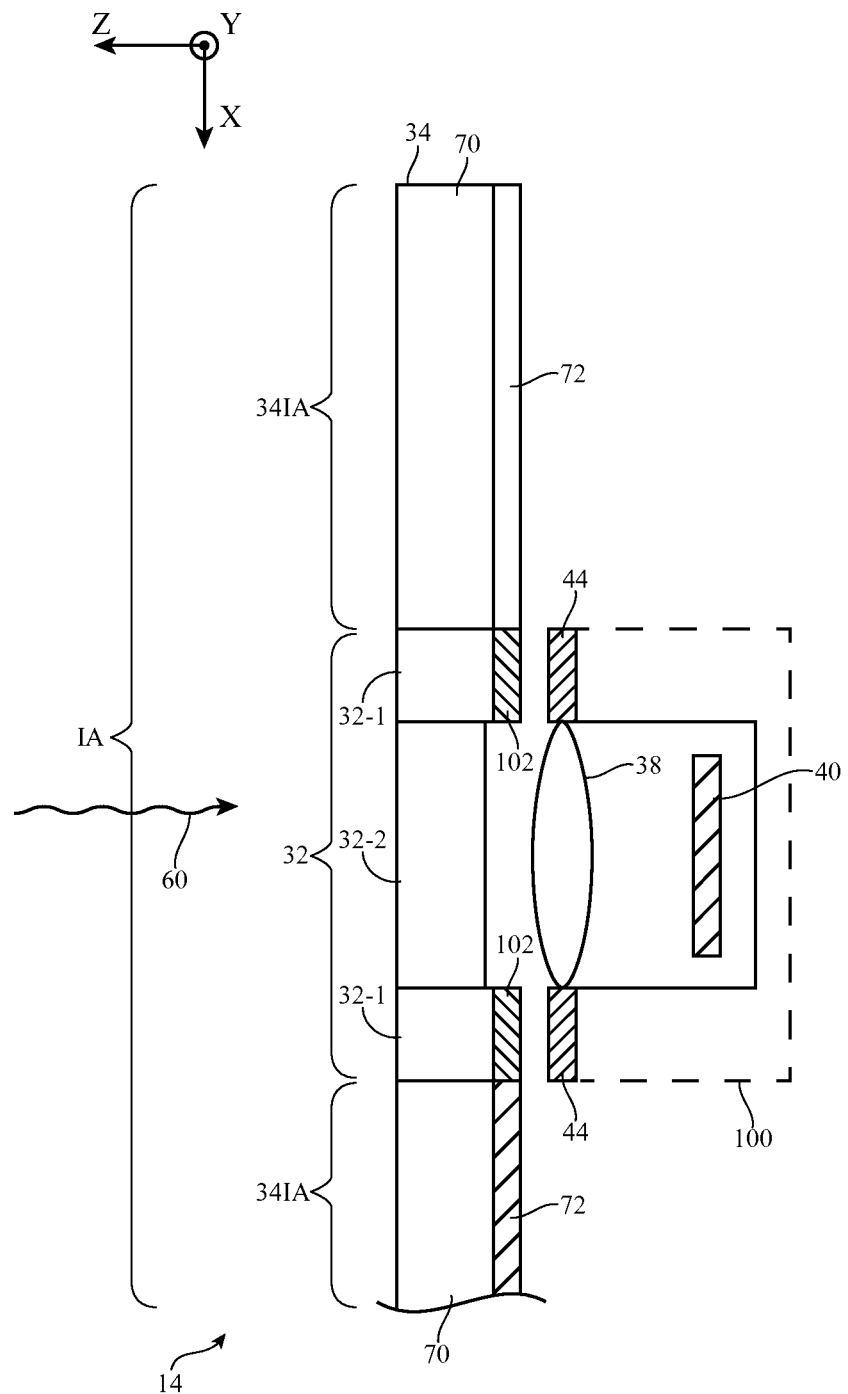
FIG. 12 is a cross-sectional side view of an illustrative display window structure with aligned infrared and visible light-based components in accordance with an embodiment.

A cross-sectional side view of an illustrative window arrangement that supports both infrared light components and visible light components is shown in FIG. 12. As shown in FIG. 12, window 32 has a first portion such as portion 32-1 and a second portion such as portion 32-2. Portion 32-2 may be circular or other suitable shape. Portion 32-1 may run along the border of portion 32-2. For example, if portion 32-2 has a circular outline (when viewed along axis Z), portion 32-1 may have the shape of a circular ring that surrounds portion 32-2. If portion 32-2 has other shapes (e.g., if portion 32-2 is rectangular, etc.), portion 32-1 may have a rectangular ring shape, may have the shape of a strip of material that runs along one or more of the edges of the rectangular portion 32-2, etc. The use of a circular central window portion and a circular ring portion that surrounds the central window portion in FIG. 12 is merely illustrative.

Circular window portion 32-2 may be formed from a material such as clear glass, transparent plastic, sapphire, or other material that is transparent at visible wavelengths. This allows visible wavelengths of light 60 to pass through window portion 32-2, through visible lens 38, and onto digital image sensor 40. Sensor 40 may have sufficient resolution (e.g., 1-20 megapixels or more or other suitable resolution) to form digital images of users in the vicinity of device 10. If desired, sensor 40 and lens 38 may be packaged in a package such as package 100 (e.g., to form a camera module). There is one sensor 40 in the illustrative configuration of FIG. 12, but additional sensors 40 may be provided if desired (e.g., a pair of image sensors and associated lenses may be used to gather stereoscopic images).

Infrared sensors 44 (e.g., an array of three infrared sensors or other suitable number of sensors that are sensitive at wavelengths of 5-14 microns 8-14 microns, or other suitable wavelengths) may be mounted in alignment with portion 32-1 of window. If, for example, window 32-1 has a circular ring shape, sensors 44 may be distributed evenly around the ring. Window layer 102 may be an infrared transparent ring member, a coating, or other material that is transparent to infrared light while blocking visible light. Window layer 102 may be a chalcogenide glass, a polymer coating, or other material that transmits infrared wavelengths of light 60 at a wavelength between 5-14 microns or other suitable wavelength range so that this light can be sensed by infrared sensors 44. The window coating 102 may also block visible light to help provide window portion 32-1 with an appearance that matches the opaque (e.g., black, white, etc.) appearance of portion 34IA of outer layer 34 in inactive region IA of display 14. Infrared sensors 44 may be mounted on package 100 (i.e., sensors 44 may be integrated with digital image sensor 40 to form a combined camera and infrared sensor assembly), may be mounted between the peripheral edges of lens 38 and window portion 32-1, or may be mounted elsewhere in the interior of device housing 12 in alignment with window 32.

Figure 13:
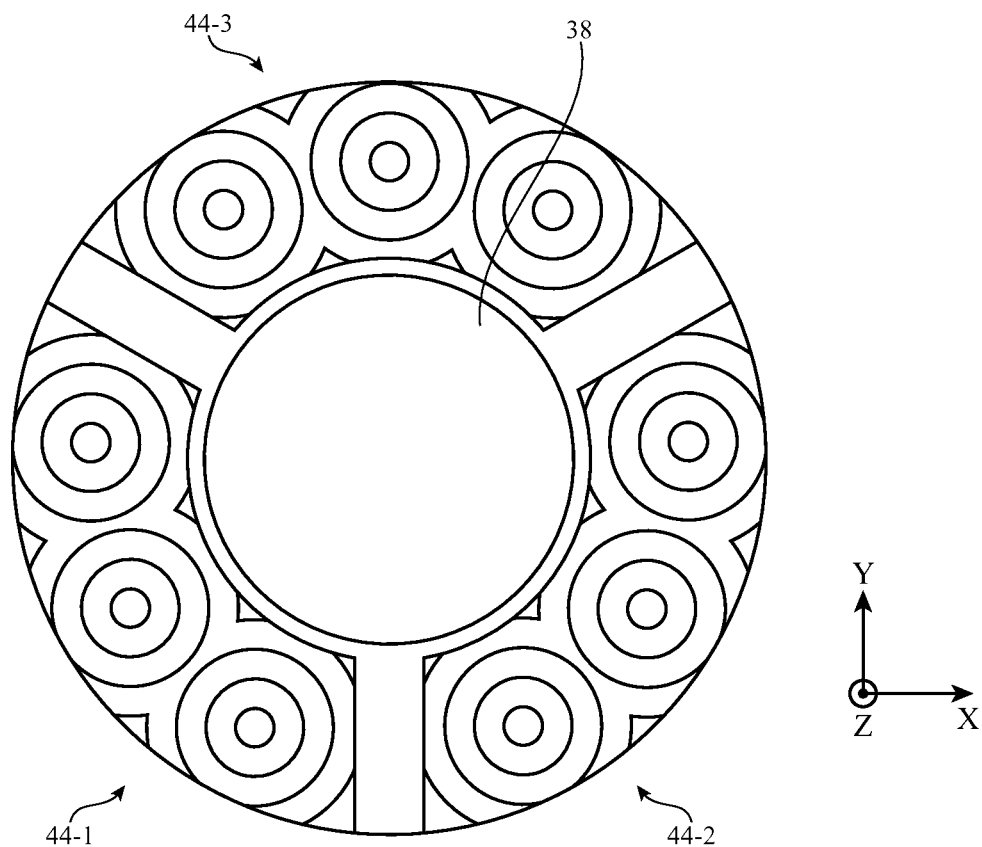
FIG. 13 is a diagram showing how multiple light sensors such as infrared light sensors may be mounted in a ring that surrounds a lens for a visible light camera in accordance with an embodiment.
Figure 14:
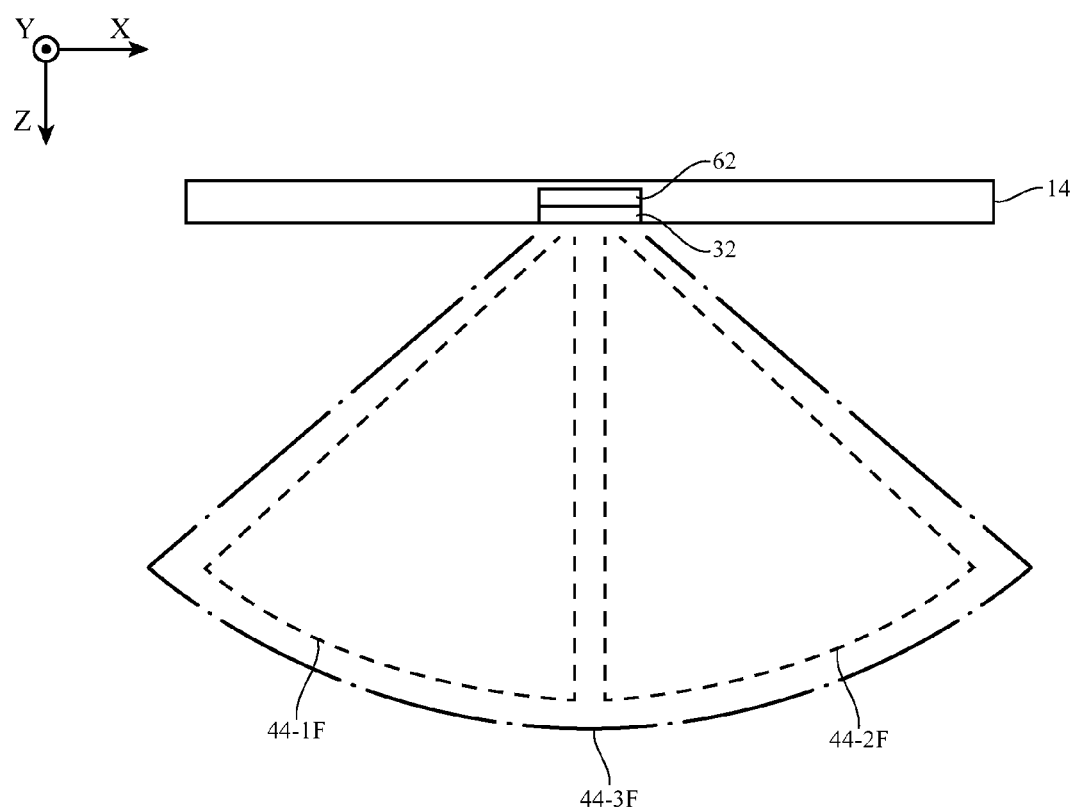
FIG. 14 is a top view of an illustrative display that has a sensor arrangement of the type shown in FIG. 13 for gathering information on the operating environment of a device in accordance with an embodiment.

FIG. 13 is a front view of the camera and infrared sensor structures of FIG. 12 in an illustrative configuration in which sensors 44 include three infrared sensors: sensors 44-1, 44-2, and 44-3. Sensors 44-1, 44-2, and 44-3 may be equally spaced in a ring that surrounds lens 38. Each of sensors 44-1, 44-2, and 44-3 may have a respective lens (e.g., a Fresnel lens) that gathers infrared wavelengths of light 60 from a different direction. This allows different sensors to have different fields of view in the front of device 10. As shown in FIG. 14, for example, sensors 44-1 and 44-2 may have respective left-hand and right-hand fields of view 44-1F and 44-2F and sensor 44-3 may have a field of view such as field of view 44-3F that covers both the left-hand and right-hand fields of view.

Different types of sensors may be used for sensors 44-1, 44-2, and 44-3. For example, sensors 44-1 and 44-2 may be thermopile infrared sensors (i.e., sensors that include one or more thermocouple elements for measuring infrared light) and sensor 44-3 may be a pyroelectric sensor (i.e., a sensor that generates output in response to infrared light exposure through the pyroelectric effect). Other type of sensors may be used, if desired (e.g., compound semiconductor detectors, quantum dot detectors, other types of semiconductor detectors, etc.). The use of thermopile and pyroelectric sensors is merely illustrative.

Figure 15:
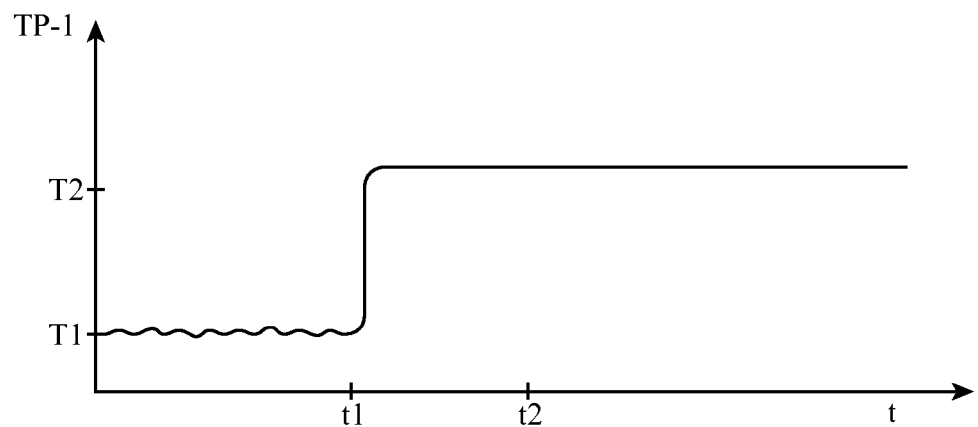
FIG. 15 is a graph of an illustrative first thermopile sensor output as a function of time in accordance with an embodiment.
Figure 16:
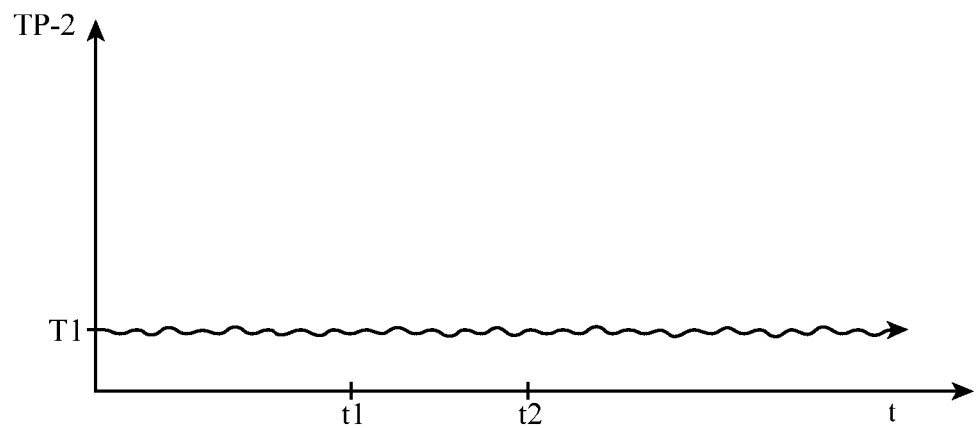
FIG. 16 is a graph of an illustrative second thermopile sensor output as a function of time in accordance with an embodiment.
Figure 17:
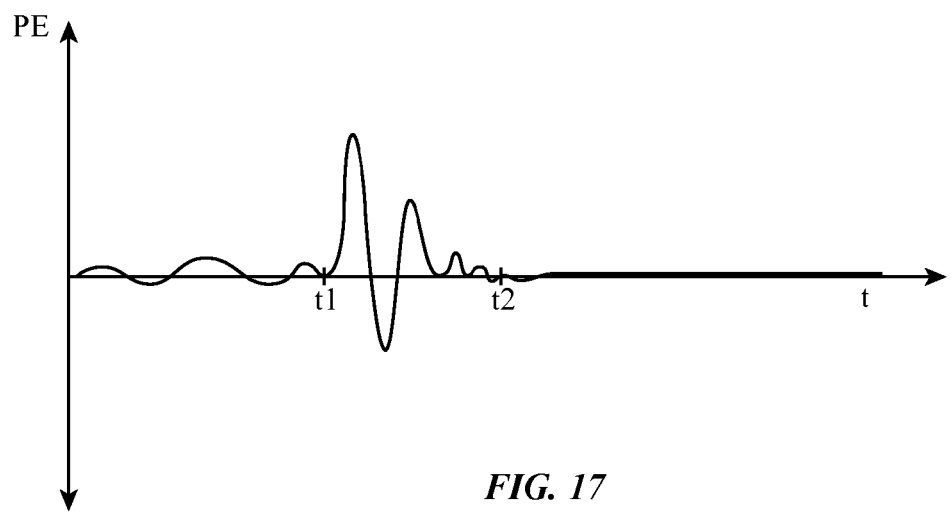
FIG. 17 is a graph of an illustrative pyroelectric sensor output as a function of time in accordance with an embodiment.

The graphs of FIGS. 15, 16, and 17 illustrate how a pair of thermopile detectors (e.g., first sensor 44-1 and second sensor 44-2) and a pyroelectric sensor (e.g., sensor 44-3) may be used to detect users in the vicinity of device 10. Sensors 44-1, 44-2, and 44-3 may be sensitive to wavelengths that lie within ranges such as 5-14 microns, 8-14 microns, or other suitable wavelength ranges. In the graph of FIG. 15, the output of sensor 44-1 (output TP-1) has been plotted as a function of time. In the illustrative scenario of FIG. 15, no user is present within the angle of view of sensor 44-1 (e.g., field-of-view 44-1F) at times before time t1. At time t1, a user moves into detection range and the output signal TP-1 rises from background level T1 to level T2. Level T2 is sufficiently large for device 10 to conclude that a user has moved into position on the left side of device 10. Sensor TP-2 (in this example) only registers background noise at level T1, because no users have entered right-hand field of view 44-2F. The signals TP-1 and TP-2 may be direct current (DC) signals. The output PE of pyroelectric detector PE may be an alternating current (AC) signal that is responsive to movement of users within the field of view of sensor 44-1 (see, e.g., field of view 44-3F of FIG. 14). As shown in FIG. 17, output PE exhibits fluctuations when a user moves within the range of sensor 44-3.

By processing the signals from sensors such as sensors 44-1, 44-2, and 44-3, device 10 can monitor for the presence of users in the vicinity of device 10. The static signal at level T1 for sensors 44-1 and 44-2 can be considered background thermal noise. Changes to this signal can be considered signals of interest and an indication that a user has moved into range. Sensors 44-1 and 44-2 cover different angular ranges (e.g., to cover left and right sides of a room). When signal TP-1 goes high and signal TP-2 remains low, device 10 can conclude that a user is present in the left half of the room. Sensor 44-3 may monitor the entire room in which device 10 is located (e.g., by covering larger field of view 44-3F) and may detect changes of signal level PE due to movement of the user. By combining signals from multiple sensors, user presence detection accuracy can be enhanced and interference from stray light signals and other sources of ambient room noise can be minimized. If desired, additional sensors (e.g., a camera) may be activated and/or additional actions taken when a user's presence is detected (e.g., to provide further confirmation of the presence of a user, to provide user-specific features, to turn on display 14, to adjust audio playback, to identify a detected user, etc.). Sensors 44-1, 44-2, and 44-3 may be operated in a continuously on mode that consumes relatively small amounts of power. When sensors 44-1, 44-2, and 44-3 detect a user, higher power consumption components 62 can be used and additional device functions can be activated.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a display having an active area and an inactive area, wherein the display has a display layer with a first transparent portion in the inactive area and a second transparent portion in the active area;
   at least one light-based component, wherein the at least one light-based component comprises an infrared detector that measures infrared light in a wavelength range between 8 and 14 microns; and
   a window in the first transparent portion of the display layer, wherein the window is in alignment with the light-based component, wherein the first transparent portion of the display layer has an opening, and wherein the window has a window member in the opening that is transparent at a wavelength in the range of 5-12 microns.

2. The electronic device defined in claim 1 wherein the display layer and the window member are formed from different materials.

3. The electronic device defined in claim 2 wherein the display layer comprises glass.

4. The electronic device defined in claim 3 wherein the window member is formed from a material selected from the group consisting of: magnesium fluoride, calcium fluoride, zinc selenide, zinc sulfide, and plastic.

5. The electronic device defined in claim 4 further comprising a layer of opaque masking material on the portion of the display layer in the inactive region, wherein the opaque masking material has an opening for the window.

6. The electronic device defined in claim 5 wherein the window further comprises an opaque layer of material that blocks visible light.

7. The electronic device defined in claim 6 wherein the opaque layer of material comprises chalcogenide glass.

8. The electronic device defined in claim 7 wherein the opaque masking material comprises black ink and wherein the opaque layer of material comprises black chalcogenide glass.

9. The electronic device defined in claim 8 wherein the display layer comprises a display cover layer.

10. The electronic device defined in claim 9 wherein the display comprises a liquid crystal display having an array of pixels in the active area.

11. The electronic device defined in claim 9 wherein the display comprises an organic light-emitting diode display having an array of pixel in the active area.

12. The electronic device defined in claim 6 wherein the window member has a first index of refraction and wherein the window has a layer of polymer that surrounds the window member in the opening, wherein the layer of polymer has a second index of refraction that differs from the first index of refraction.

13. The electronic device defined in claim 1 wherein the at least one light-based component comprises a two-dimensional infrared sensor.

14. An electronic device, comprising:
- a display having an active area and an inactive area, wherein the display has a display layer with a portion in the inactive area;
- at least one infrared detector;
- a visible light camera; and
- a window that is formed in an opening in the portion of the display layer in the inactive area and that overlaps the at least one infrared detector and the visible light camera.

15. The electronic device defined in claim 14 wherein the window includes a transparent window member through which visible light passes to a lens in the visible light camera.

16. The electronic device defined in claim 15 wherein the window includes a window portion that blocks visible light and that transmits infrared light to the at least one infrared detector.

17. The electronic device defined in claim 16 wherein the window portion passes light in at least one wavelength region between 5 and 14 microns.

18. The electronic device defined in claim 17 wherein the window portion has a ring shape with a central opening and wherein the transparent window member is located in the central opening.

19. The electronic device defined in claim 14 wherein the at least one infrared detector comprises a plurality of infrared detectors each of which has a corresponding Fresnel lens that directs light from a different respective field of view into that infrared detector.

20. The electronic device defined in claim 14 wherein the at least one infrared detector comprises at least two thermopile detectors and a pyroelectric detector.

21. The electronic device defined in claim 14 wherein the window has a ring-shaped portion that passes infrared light to the at least one infrared detector while blocking visible light.

22. The electronic device defined in claim 21 wherein the ring-shaped portion includes chalcogenide glass.

23. An electronic device, comprising:
- a display having an active area and an inactive area, wherein the display has a transparent display cover layer with a portion in the inactive area;
- a window in the portion of the transparent display cover layer in the inactive area, wherein the window is formed from an opening the transparent display cover layer; and
- an infrared component that operates at a wavelength between 5 and 12 microns and that receives infrared light through the window.

24. The electronic device defined in claim 23 wherein the opening is one of a cluster of openings, and wherein the openings are filled with polymer that is transparent at the wavelength.

25. The electronic device defined in claim 23 wherein the display layer comprises a layer of glass and wherein the opening is formed from a locally thinned portion of the glass.

26. The electronic device defined in claim 23 wherein the infrared component comprises an infrared image sensor.

27. The electronic device defined in claim 23 further comprising chalcogenide glass in the window to block visible light.

28. The electronic device defined in claim 27 further comprising a window member for the window that is mounted in the opening, wherein the window member comprises a material that is transparent at the wavelength and wherein the chalcogenide glass is aligned with the window member.

* * * * *